(12) United States Patent
Chandra et al.

(10) Patent No.: US 9,565,132 B2
(45) Date of Patent: Feb. 7, 2017

(54) MULTI-PROTOCOL I/O INTERCONNECT INCLUDING A SWITCHING FABRIC

(75) Inventors: Prashant R. Chandra, Santa Clara, CA (US); Kevin C. Kahn, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 287 days.

(21) Appl. No.: 13/338,220

(22) Filed: Dec. 27, 2011

(65) Prior Publication Data
US 2013/0163605 A1   Jun. 27, 2013

(51) Int. Cl.
*H04L 12/56* (2006.01)
*H04L 12/933* (2013.01)
*H04L 12/931* (2013.01)
*H04L 12/781* (2013.01)

(52) U.S. Cl.
CPC .............. *H04L 49/10* (2013.01); *H04L 49/35* (2013.01); *H04L 45/52* (2013.01)

(58) Field of Classification Search
CPC .......... H04L 45/52; H04L 49/10; H04L 49/35; H04L 12/46
USPC .......... 370/315–317, 332, 492; 710/312, 317
See application file for complete search history.

(56) References Cited

U.S. PATENT DOCUMENTS

| | | | |
|---|---|---|---|
| 5,242,315 A | 9/1993 | O'Dea | |
| 5,251,205 A * | 10/1993 | Callon et al. | 370/392 |
| 5,267,337 A | 11/1993 | Kirma | |
| 5,419,717 A | 5/1995 | Abendschein et al. | |
| 5,535,036 A | 7/1996 | Grant | |
| 5,920,566 A * | 7/1999 | Hendel et al. | 370/401 |
| 5,938,736 A * | 8/1999 | Muller et al. | 709/243 |
| 6,014,380 A * | 1/2000 | Hendel et al. | 370/392 |
| 6,108,782 A | 8/2000 | Fletcher et al. | |
| 6,478,625 B2 | 11/2002 | Tolmie et al. | |
| 6,487,169 B1 * | 11/2002 | Tada | 370/219 |
| 6,536,670 B1 | 3/2003 | Postman et al. | |
| 6,549,966 B1 | 4/2003 | Dickens et al. | |
| 6,588,938 B1 | 7/2003 | Lampert et al. | |

(Continued)

FOREIGN PATENT DOCUMENTS

| | | |
|---|---|---|
| JP | 10-233820 | 9/1998 |
| JP | 2001-358733 | 12/2001 |

(Continued)

OTHER PUBLICATIONS

International Search Report and Written Opinion received for International Application No. PCT/US2008/084621, mailed on May 18, 2009.

(Continued)

*Primary Examiner* — Shaq Taha
(74) *Attorney, Agent, or Firm* — Compass IP Law

(57) ABSTRACT

Described are embodiments of methods, apparatuses, and systems for multi-protocol tunneling across a multi-protocol I/O interconnect of computer apparatus. A multi-protocol I/O interconnect may include a switching fabric operatively coupled to a first protocol-specific controller and a second protocol-specific controller, and may be configured to simultaneously route packets of the first protocol to the first protocol-specific controller and packets of the second protocol to the second protocol-specific controller. Other embodiments may be described and claimed.

21 Claims, 15 Drawing Sheets

(56) References Cited

U.S. PATENT DOCUMENTS

| | | | |
|---|---|---|---|
| 6,697,379 B1* | 2/2004 | Jacquet et al. | 370/469 |
| 6,783,283 B2 | 8/2004 | Nishita | |
| 6,839,771 B1 | 1/2005 | Bouchier et al. | |
| 7,081,023 B2 | 7/2006 | Zhang et al. | |
| 7,095,927 B2 | 8/2006 | Yamada et al. | |
| 7,096,310 B2* | 8/2006 | Norden | 710/317 |
| 7,171,505 B2 | 1/2007 | Kuhlmann et al. | |
| 7,283,481 B2 | 10/2007 | Huff | |
| 7,330,468 B1 | 2/2008 | Tse-Au | |
| 7,412,544 B2 | 8/2008 | Gibson et al. | |
| 7,437,738 B2 | 10/2008 | Shah et al. | |
| 7,587,536 B2 | 9/2009 | McLeod | |
| 7,646,981 B2 | 1/2010 | Coffey | |
| 7,673,080 B1* | 3/2010 | Yu et al. | 710/62 |
| 7,677,813 B2 | 3/2010 | Anrig et al. | |
| 7,734,172 B2 | 6/2010 | Tse-Au | |
| 8,051,217 B2 | 11/2011 | Goodart et al. | |
| 8,121,139 B2 | 2/2012 | Sunaga et al. | |
| 2002/0049862 A1 | 4/2002 | Gladney et al. | |
| 2004/0081158 A1* | 4/2004 | Moll et al. | 370/395.1 |
| 2004/0230735 A1* | 11/2004 | Moll | 710/312 |
| 2005/0210177 A1* | 9/2005 | Norden | 710/317 |
| 2005/0238052 A1* | 10/2005 | Yamazaki | 370/469 |
| 2006/0126612 A1* | 6/2006 | Sandy et al. | 370/389 |
| 2006/0184711 A1* | 8/2006 | Pettey et al. | 710/316 |
| 2006/0271706 A1* | 11/2006 | Dugan et al. | 709/245 |
| 2007/0005867 A1 | 1/2007 | Diamant | |
| 2007/0233916 A1* | 10/2007 | Seto | 710/100 |
| 2007/0249193 A1 | 10/2007 | Penumatcha et al. | |
| 2008/0013569 A1* | 1/2008 | Boren | 370/466 |
| 2009/0010152 A1* | 1/2009 | Ofek et al. | 370/216 |
| 2009/0031017 A1* | 1/2009 | Elko et al. | 709/223 |
| 2009/0066704 A1* | 3/2009 | Daniel et al. | 345/501 |
| 2009/0172185 A1 | 7/2009 | Chandra et al. | |
| 2009/0274162 A1* | 11/2009 | Gopal Gowda et al. | 370/419 |
| 2010/0049885 A1 | 2/2010 | Chandra et al. | |
| 2010/0091775 A1* | 4/2010 | Yamamoto | 370/392 |
| 2010/0211740 A1* | 8/2010 | Rajan et al. | 711/114 |
| 2010/0274907 A1* | 10/2010 | Hirasawa et al. | 709/227 |
| 2011/0035529 A1* | 2/2011 | Wang et al. | 710/317 |
| 2011/0055433 A1* | 3/2011 | Kishore et al. | 710/9 |
| 2011/0075549 A1* | 3/2011 | Lu et al. | 370/216 |
| 2011/0090797 A1* | 4/2011 | Beecroft | 370/237 |
| 2011/0090916 A1* | 4/2011 | Bitar | 370/413 |
| 2011/0202701 A1* | 8/2011 | Maitra | 710/308 |
| 2011/0219164 A1* | 9/2011 | Suzuki et al. | 710/316 |
| 2011/0228767 A1* | 9/2011 | Singla et al. | 370/389 |
| 2011/0228789 A1* | 9/2011 | Jia | 370/401 |
| 2011/0255533 A1* | 10/2011 | Gnanasekaran | 370/389 |
| 2011/0283017 A1* | 11/2011 | Alkhatib et al. | 709/244 |
| 2012/0124257 A1* | 5/2012 | Wu | 710/106 |
| 2012/0254462 A1* | 10/2012 | Sengupta et al. | 709/238 |
| 2012/0260127 A1* | 10/2012 | Jibbe et al. | 714/6.21 |
| 2012/0284434 A1* | 11/2012 | Warren et al. | 710/22 |
| 2012/0287939 A1* | 11/2012 | Leu et al. | 370/409 |
| 2013/0024579 A1* | 1/2013 | Zhang et al. | 709/230 |
| 2013/0042240 A1* | 2/2013 | Cardona et al. | 718/1 |
| 2013/0058215 A1* | 3/2013 | Koponen et al. | 370/241 |
| 2013/0058354 A1* | 3/2013 | Casado et al. | 370/401 |
| 2013/0089097 A1* | 4/2013 | Filsfils et al. | 370/393 |
| 2013/0138854 A1* | 5/2013 | Bandholz et al. | 710/302 |

FOREIGN PATENT DOCUMENTS

| | | |
|---|---|---|
| KR | 10-2001-0076079 | 8/2001 |
| WO | 2009/085494 | 7/2009 |
| WO | 2010/021844 | 2/2010 |

OTHER PUBLICATIONS

International Preliminary Report on Patentability for International Application No. PCT/US2008/084621, mailed on Jul. 8, 2010.

International Search Report/Written Opinion for International Application No. PCT/US2009/052831, mailed on Mar. 15, 2010.

International Preliminary Report on Patentability and Written Opinion received for International Application No. PCT/US2009/052831, Mailed on Mar. 3, 2011.

Office Action for Taiwan Application No. 97147418, mailed Jun. 14, 2012.

Search Report for European Application No. 09808593.9, mailed on Aug. 19, 2011.

Office Action for European Application No. 09808593.9, mailed Sep. 13, 2011.

Search Report for European Application No. 08868735.5, mailed on Sep. 2, 2011.

Office Action for European Application No. 08868735.5, mailed on mailed Sep. 29, 2011.

Office Action for Korean Application No. 10-2010-7016587, mailed Jul. 11, 2011.

Office Action for Korean Application No. 10-2010-7016587, mailed Apr. 26, 2012.

Office Action for Japanese Application No. 2010-540703, mailed Nov. 22, 2011.

Office Action for Chinese Application No. 200880122959.5, mailed Mar. 19, 2012.

* cited by examiner

| 63 | | | | | | | | | | | | | 0 |
|---|---|---|---|---|---|---|---|---|---|---|---|---|---|
| CM | Rsvd | Level 6 Port # | R | Level 5 Port # | R | Level 4 Port # | R | Level 3 Port # | R | Level 2 Port # | R | Level 1 Port # | R | Level 0 Port # |
| 1 | 9 | 6 | 2 | 6 | 2 | 6 | 2 | 6 | 2 | 6 | 2 | 6 | 2 | 6 |

FIG. 8

| 63 | | | | | | | | | | | | | 0 |
|---|---|---|---|---|---|---|---|---|---|---|---|---|---|
| V | Rsvd | Level 6 Port # | R | Level 5 Port # | R | Level 4 Port # | R | Level 3 Port # | R | Level 2 Port # | R | Level 1 Port # | R | Level 0 Port # |
| 1 | 9 | 6 | 2 | 6 | 2 | 6 | 2 | 6 | 2 | 6 | 2 | 6 | 2 | 6 |

FIG. 9

MULTI-PROTOCOL I/O INTERCONNECT INCLUDING A SWITCHING FABRIC

TECHNICAL FIELD

Embodiments of the present disclosure relate generally to multi-protocol tunneling across a multi-protocol I/O interconnect of a computer apparatus.

BACKGROUND

Conventional computer platform architectures include a variety of host controllers to implement a number of different types of I/O between computer platforms and peripheral devices that are connected to the platforms, and these computer platforms generally include protocol-specific connection interfaces that connect to the peripheral devices via protocol-specific plugs and cables. For example, a computer may include one or more of a USB-specific controller that connects to a peripheral device via a USB-specific connection interface, a display-specific controller (e.g., DisplayPort) that connects to a peripheral device via a display-specific connection interface, a PCI Express®-controller that connects to a peripheral device via a PCI Express®-specific connection interface, and so on.

BRIEF DESCRIPTION OF THE DRAWINGS

Embodiments of the present disclosure will be described by way of example embodiments, but not limitations, illustrated in the accompanying drawings in which like references denote similar elements, and in which:

FIG. 8 describes a format of a route string for routing configuration packets in a domain, in accordance with various embodiments of the present disclosure.

FIG. 9 describes a format of a topology ID configuration register, in accordance with various embodiments of the present disclosure.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Figure 1:
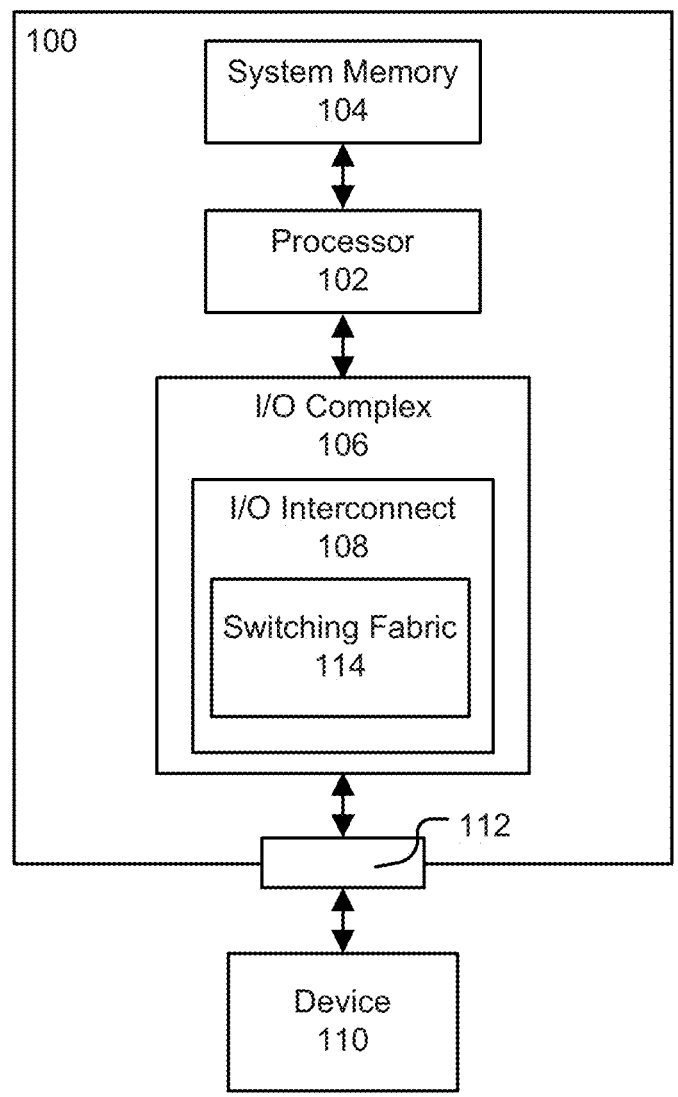
FIG. 1 describes a computer apparatus including a multi-protocol tunneling I/O interconnect, in accordance with various embodiments of the present disclosure.

FIG. 1 describes a computer apparatus 100 including a multi-protocol tunneling I/O interconnect 108 in accordance with various embodiments. In many embodiments, the computer apparatus 100 may include one or more processors 102. In different embodiments, the one or more processors 102 may include one core or multiple cores. In some embodiments, the apparatus 100 may be a multiprocessor system (not shown) where each of the processors has one core or multiple cores.

As shown in FIG. 1, the one or more processors 102 may be operatively coupled to system memory 104 through one or more links (e.g., interconnects, buses, etc). System memory 104 may be capable of storing information that the one or more processors 100 utilize to operate and execute programs and operating systems. In different embodiments, system memory 104 may be any usable type of readable and writeable memory such as a form of dynamic random access memory (DRAM).

In previously implemented computer apparatuses, an I/O link connecting a peripheral device to a computer system is protocol-specific with a protocol-specific connector port that allows a compatible peripheral device to be attached to the protocol-specific connector port (i.e., a USB keyboard device would be plugged into a USB port, a router device would be plugged into a LAN/Ethernet port, etc.) with a protocol-specific cable. Any single connector port would be limited to peripheral devices with a compatible plug and compatible protocol. Once a compatible peripheral device is plugged into the connector port, a communication link would be established between the peripheral device and a protocol-specific controller.

In the computer apparatus as described in the embodiment shown in FIG. 1, the one or more processors 102 may be operatively coupled to an I/O complex 106, which may house one or more multi-protocol I/O interconnects 108 configured to control one or more I/O links that allow the one or more processors 102 to communicate with one or more I/O peripheral devices 110. For providing the multi-protocol capability, at least in part, the I/O interconnect 108 may include a multi-protocol switching fabric 114 configured to carry multiple I/O protocols. In various embodiments, the multi-protocol switching fabric 114 may comprise a plurality of cross-bar switches. Examples of I/O peripheral devices 110 may include a display device, a keyboard device, an expansion port, a desktop or mobile computer system, or a router, among other devices.

A non-protocol-specific connector port 112 may be configured to couple the I/O interconnect 108 with a connector port (not shown) of the device 110, allowing multiple device types to attach to the computer system 100 through a single physical connector port 112. Moreover, the I/O link between the device 110 and the I/O complex 106 may be configured to carry multiple I/O protocols (e.g., PCI Express®, USB, DisplayPort, HDMI®, etc.) simultaneously. In various embodiments, the connector port 112 may be capable of providing the full bandwidth of the link in both directions with no sharing of bandwidth between ports or between upstream and downstream directions. In various embodiments, the connection between the I/O interconnect 108 and the device 110 may support electrical connections, optical connections, or both.

Figure 2:
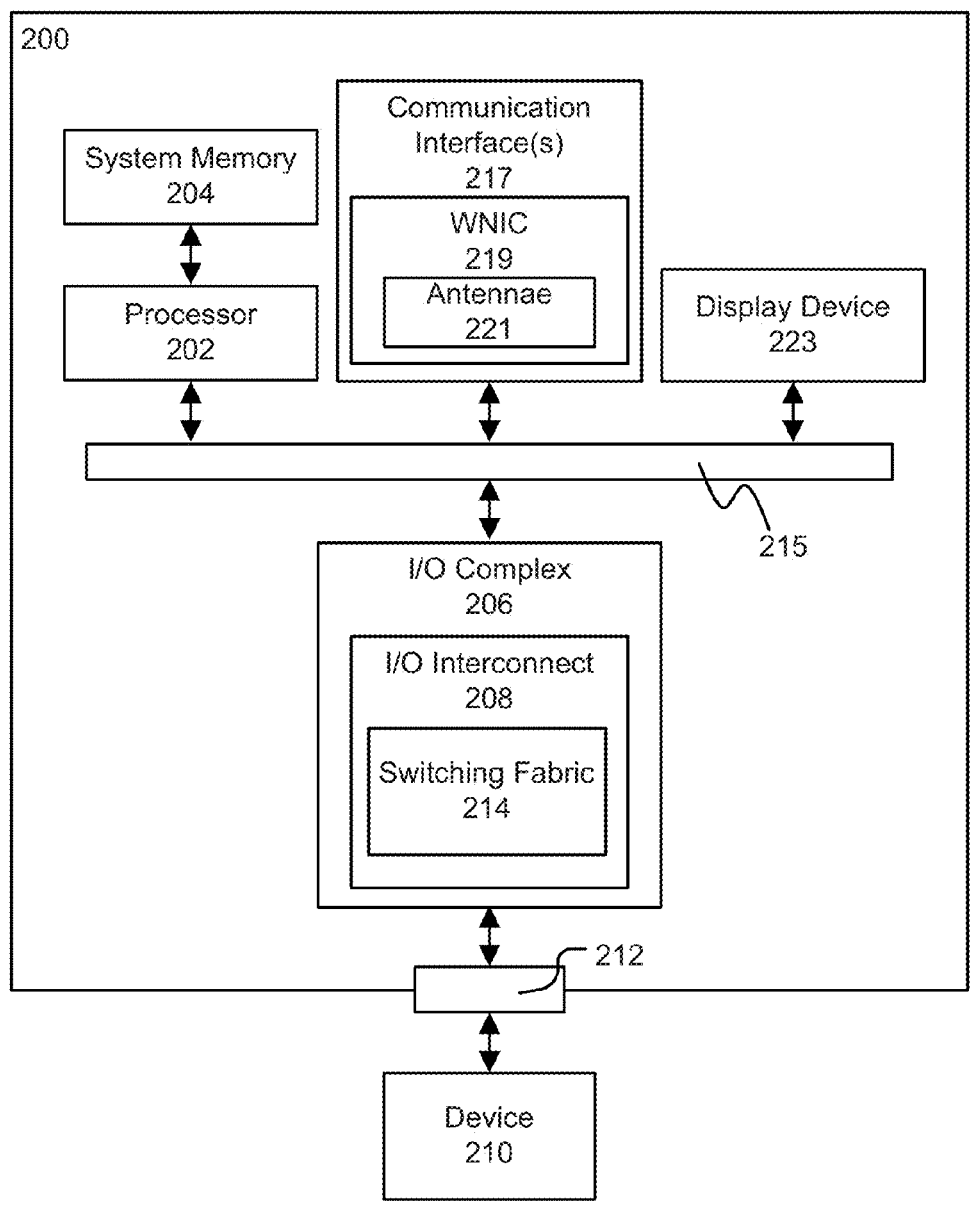
FIG. 2 describes a computer system including a multi-protocol tunneling I/O interconnect, in accordance with various embodiments of the present disclosure.

The apparatus 100 may be a stand-alone device or may be incorporated into various systems including, but not limited to, various computing and/or consumer electronic devices/appliances, such as desktop computing device, a mobile computing device (e.g., a laptop computing device, a hand-held computing device, a tablet, a netbook, etc.), mobile phones, smart phones, personal digital assistants, servers, workstations, set-top boxes, digital reorders, game consoles, digital media players, and digital cameras. A block diagram of an example system 200 is illustrated in FIG. 2. The system 200 may comprise one or more processor(s) 202, system memory 204, and an I/O complex 206, all operatively coupled by a bus 115. The I/O complex 206 may include one or more multi-protocol I/O interconnects 208, each of which include a switching fabric 214 and control one or more I/O links that allow the one or more processors 202 to communicate with one or more I/O peripheral devices 210. In various embodiments, the system 200 may have more or fewer components, and/or different architectures.

The system 200 may include communications interface(s) 217 operatively coupled to the bus 215 to provide an interface for system 200 to communicate over one or more networks and/or with any other suitable device. The communications interface(s) 217 may include any suitable hardware and/or firmware. The communications interface(s) 217 for one embodiment may include, for example, a network adapter, a wireless network adapter, a telephone modem, and/or a wireless modem. For wireless communications, the communications interface(s) 217 for one embodiment may include a wireless network interface controller 219 having one or more antennae 221 to establish and maintain a wireless communication link with one or more components of a wireless network. The system 200 may wirelessly communicate with the one or more components of the wireless network in accordance with any of one or more wireless network standards and/or protocols.

The system 100 may include a display device 223, such as, for example, a cathode ray tube (CRT), liquid crystal display (LCD), light emitting diode (LED), or other suitable display device, operatively coupled to the bus 215 for displaying information. In various embodiments, the display device 223 may be a peripheral device interconnected with the system 200. In various ones of these embodiments, such a peripheral display device may be interconnected with the I/O complex 206 by way of the multi-protocol port 212.

Figure 3:
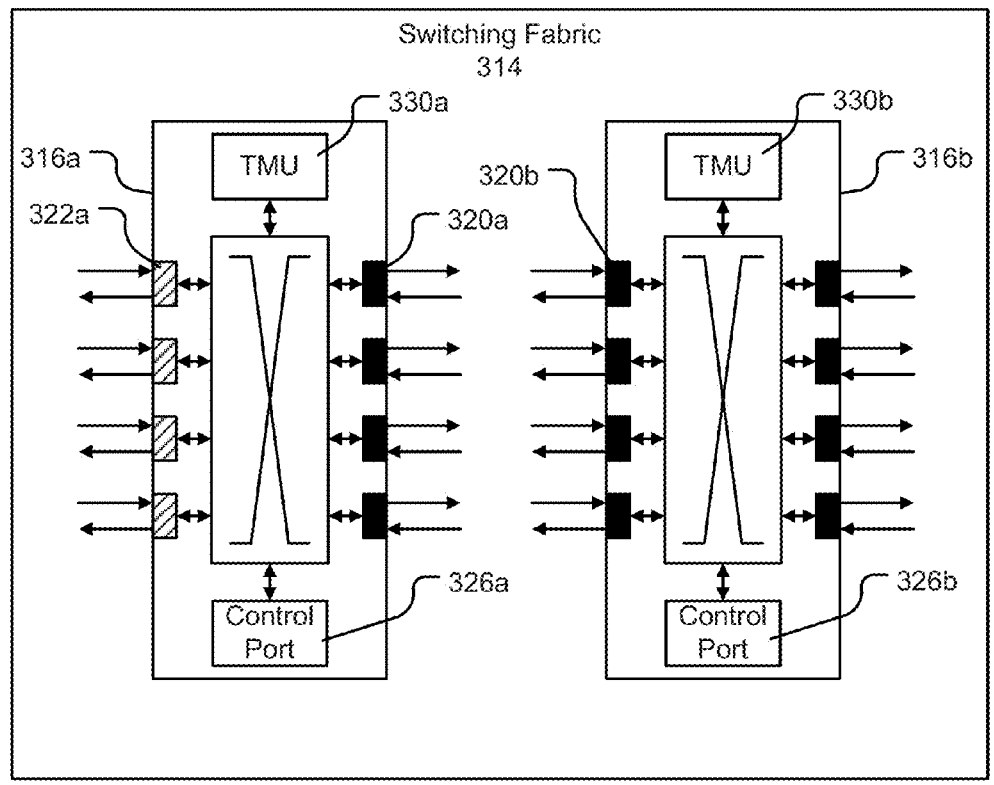
FIG. 3 describes a switching fabric of a multi-protocol tunneling I/O interconnect, in accordance with various embodiments of the present disclosure.

As described herein, for providing an I/O interconnect capable of carrying multiple I/O protocols, one or more of the various I/O interconnects described herein may include, among other things, a multi-protocol switching fabric 314 comprising a plurality of cross-bar switches, as shown in FIG. 3. The multi-protocol switching fabric 314 may be similar to other multi-protocol switching fabrics described herein. In general, the switches 316a, 316b are devices comprising multiple ports 320s, 320b, 322a with the ability to route a packet from any input port to any output port. In various embodiments, the switches 316a, 316b may comprise any number of ports 320s, 320b, 322a, with each additionally including an internal control port 326a, 326b. The switches 316a, 316b may each optionally include a time management unit 330a, 330b for use in distributing and synchronizing time throughout the multi-protocol switching fabric 314, as described more fully herein.

Switch 316a may represent a first type of switch including null ports 320a configured to connect to a single optical or electrical link, while adapter ports 322a may be configured to connect to one or more mapped I/O protocol links. The adapter ports 322a may be used to connect mapped I/O protocol entities to the multi-protocol switching fabric 314. As used herein, the term "adapter" may be used to refer to the protocol adaptation function that may be built into the switch port to encapsulate the mapped I/O protocol packets into I/O packets that flow over the multi-protocol switching fabric 314.

Switch 316b may represent a second type of switch including only null ports 320b (like null ports 320a) configured to connect to a single optical or electrical link.

Although the switches 316a, 316b depicted in FIG. 3 each include four adapter ports 322a and four null ports 320a, 320b, the actual number of ports 320a, 320b, 322a may be fewer or more than that shown. In order to provide connectivity between switches 316a, 316b, a switch implementation generally minimally includes either at least one null port and at least one adapter port, or at least two null ports.

In various embodiments, the multi-protocol switching fabric 314 may comprise one or more of the first type of switches 316a and one or more of the second type of switches 316b.

For implementing various multi-protocol tunneling between adapter ports of a switching fabric within the scope of the present disclosure, a connection manager (not illustrated) may be provided. The connection manager may be implemented in software, firmware, as logic within an I/O complex, as part of a system BIOS, or within an operating system running on a computer apparatus or system in which the I/O complex is included.

Figure 4:
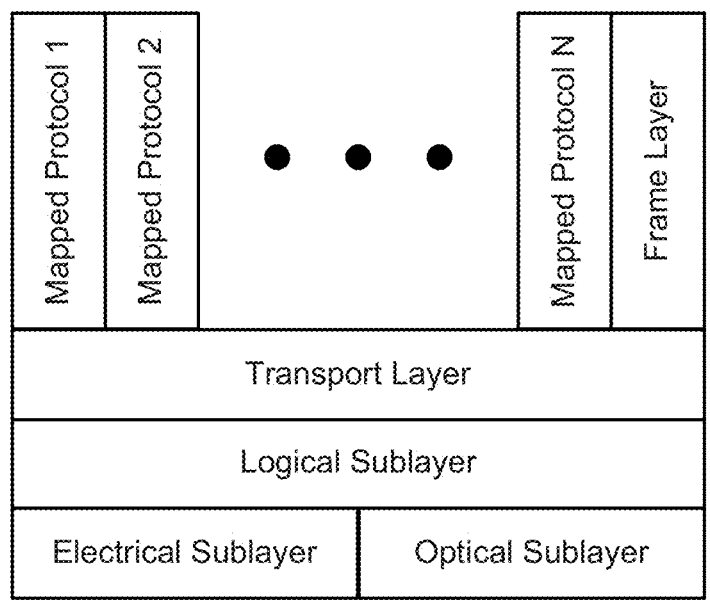
FIG. 4 describes a protocol stack for a multi-protocol interconnect architecture of an I/O complex, in accordance with various embodiments of the present disclosure.

An example protocol stack for the multi-protocol interconnect architecture of an I/O complex is shown in FIG. 4. The electrical and optical sublayers, the logical sublayer, the transport layer, and the frame layer may define the base multi-protocol interconnect architecture of the I/O complex, in which the physical layer comprises the electrical, optical, and logical sublayers. The mapped protocol layers may describe the mapping of the specific I/O protocols onto the multi-protocol interconnect architecture.

In various embodiments, and with reference to FIG. 3 and FIG. 4, the transport layer may be implemented by all ports 320a, 320b, 322a of the switches 316a, 316b of the multi-protocol switching fabric 314, the physical layer may be implemented by all null ports 320a, 320b, and the adapter ports 322a may implement a single mapped protocol layer or the frame layer.

Figure 5:
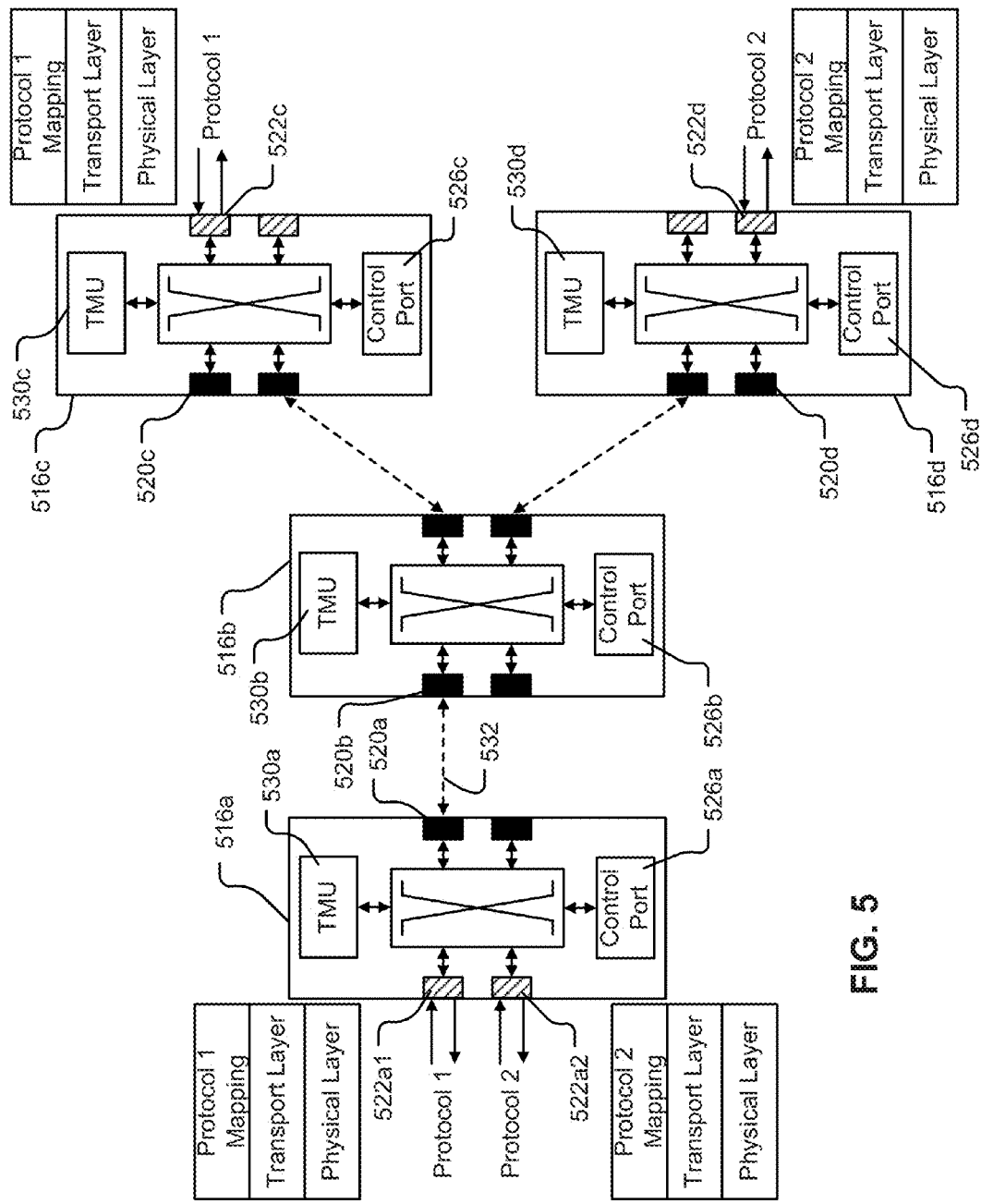
FIG. 5 describes an implementation of a protocol stack for a multi-protocol interconnect architecture of an I/O complex, in accordance with various embodiments of the present disclosure.

An example implementation of the protocol layering is shown in FIG. 5. In the example shown, two protocols are implemented using switches 516a, 516b, 516c, 516d. Each of the switches 516a, 516b, 516c, 516d include control ports 526a, 526b, 526c, 526d, and time management units 530a, 530b, 530c, 530d.

As shown, the adapter ports 522a1, 522c implement a first protocol layer (or frame layer) "protocol 1," and adapter ports 522a2, 522d implement a second protocol layer (or frame layer) "protocol 2." All ports implement the transport layer, while the physical layer is implemented by all null ports 520a, 520b, 520c, 520d.

As such, a link (e.g., link 532) between ports of switches may effectively be shared by multiple paths traversing the fabric between adapter ports of the multi-protocol switching fabric. In various embodiments, the multi-protocol interconnect architecture may be connection-oriented such that a path is configured end-to-end before data transfer takes place. The path may traverse one or more links through the multi-protocol switching fabric, and each hop, the path may be assigned a locally unique identifier that may be carried in the header of all the packets that are associated with the path. In various embodiments, packets belonging to the path may not be reordered within the multi-protocol switching fabric. Buffer allocation (flow control) and Quality of Service may be implemented on a per-path basis. As such, a path may provide virtual-wire semantics for a mapped I/O protocol across the multi-protocol switching fabric.

Figure 6A:
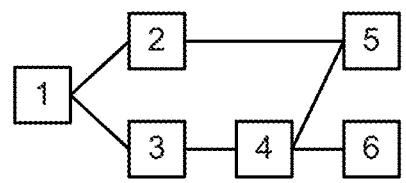
FIG. 6A describes a physical topology of a domain of switches, and FIG. 6B describes a spanning tree for managing the domain of FIG. 6A, in accordance with various embodiments of the present disclosure.
Figure 6B:
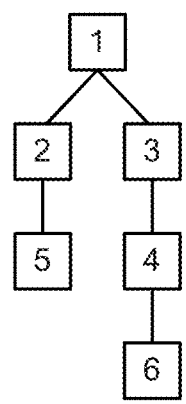

In various embodiments, the physical topology of a collection of switches (a domain) may be an arbitrarily interconnected graph. FIG. 6A shows an example of a physical topology of a domain of switches 1-6. It should be noted that a domain is a management concept rather than an operational one. In various embodiments, a connection manager, as described earlier, may configure the domains of a switching fabric. For further management purposes, a multi-protocol apparatus may be configured to create a spanning tree (by way of the connection manager, for example). FIG. 6B shows an example spanning tree created for managing the domain of FIG. 6A in which the switch 1 at the top of the spanning tree may be referred to as the root switch. It is noted that a spanning tree may include any suitable number of levels. In various embodiments, the maximum number of levels of the spanning tree may be seven.

Figure 7:
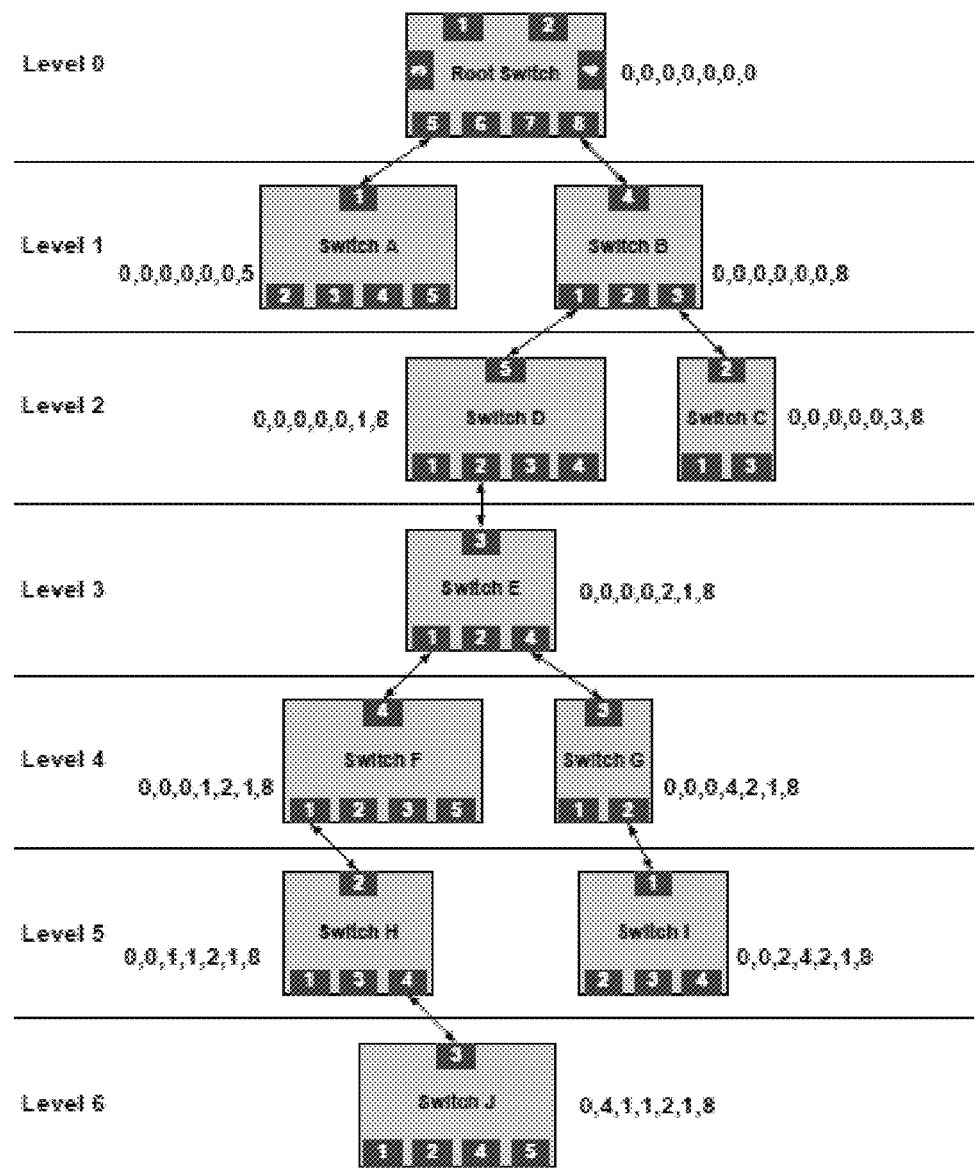
FIG. 7 describes a spanning tree in a domain, in accordance with various embodiments of the present disclosure.

FIG. 7 shows an example of a spanning tree in a domain. Also shown are example assignments of unique topology IDs to each of the switches in the domain. For example, switch J has a topology ID of 0,4,1,1,2,1,8. In various embodiments, unique topology IDs may be assigned to every switch of a domain and each topology ID may represent the position of the switch within the spanning tree of the domain. In various embodiments, the assignment of the topology IDs may be done by the connection manager during inititialization in which the domains may be created by enumerating the switches that are reachable and the topology IDs may be assigned for each switch.

As shown in FIG. 7, the domain includes seven levels (levels 0-6), and the topology IDs of each of the switches are sequences of seven port numbers representing the egress ports at each level of the tree on the path, from the root switch to itself. The topology ID of a switch at a depth of X (where X is from 0 to 6 in this example) may contain a non-zero port number for levels 0 to X−1. The port number at depth X may be 0 denoting the control port of the switch at depth X. The port numbers from depth X+1 to 6 may be treated as "don't care" and may be set at 0. Thus, in the example shown, the control port at the root switch has a topology ID of 0,0,0,0,0,0.

In various embodiments, the routing of configuration packets flowing downstream (in relation to the spanning tree) may be based on the topology ID of the target switch. The configuration packets may be routed in the transport layer packet header. In various embodiments, configuration packets flowing upstream may not use the topology ID and may simply be forwarded over the upstream port of each switch. Typically, every configuration packet carries a route string included in its payload. An example format of the route string is shown in FIG. 8. As shown, the route string may essentially be the topology ID of the switch to which the configuration request is sent or from which the configuration response originates. The MSB bit (CM bit) of the route string may be set to 0 when the configuration message is flowing downstream (from the connection manager to the switch) and set to 1 if the message is flowing in the upstream direction.

In various embodiments, each switch may be configured with its topology ID and its level in the spanning tree by the connection manager. Each switch may also be configured with the port number that points upstream to the connection manager of the domain either through hardware strapping or other similar mechanisms. In various embodiments, the topology ID, depth (in the tree), and upstream facing port may be configuration registers in the switch configuration space of every switch that are initialized by the connection manager during enumeration. An example format of the topology ID configuration register is shown in FIG. 9. For the illustrated example, the MSB of the topology ID may be a valid flag, which may be set to 0 on reset and set to 1 by the connection manager when the topology ID is initialized. The reserved bits of the topology ID may be set to 0.

Configuration packets flowing down the tree may be routed by the control port of a switch in accordance with one or more rules. For example, in various embodiments, the control port of the switch may be required to extract the port from the route string that corresponds to its configured level in the tree. In various embodiments, if the port is 0, the control port may be required to consume the packet. In various embodiments, if the port is non-zero, the control port may be required to forward the packet over the switch port that matches the port extracted from the route string. In various embodiments, configuration packets flowing up the spanning tree may simply be forwarded over the configured upstream facing port.

Figure 10:
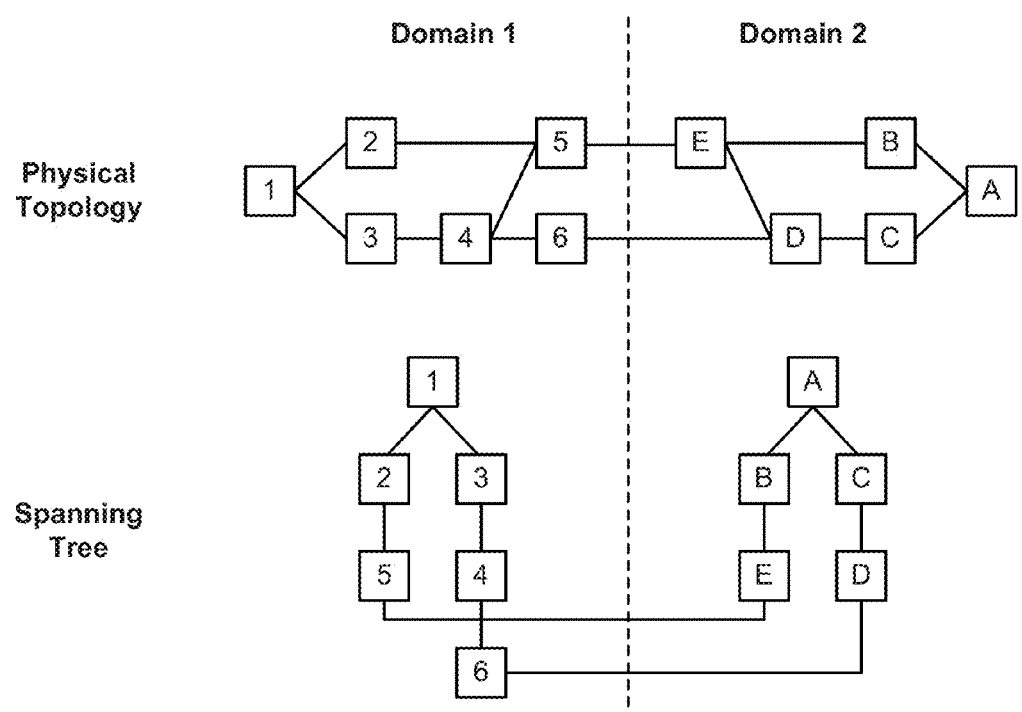
FIG. 10 describes connections that may be established between multiple domains, in accordance with various embodiments of the present disclosure.

Multiple domains may interconnected in various embodiments. FIG. 10 shows example connections that may be established between multiple domains. As shown, switches 1-6 of Domain 1 may be interconnected with switches A-E of Domain 2.

In various embodiments, inter-domain links may be discovered either when the connection manager performs the initial discovery of the topology following power-on or by processing a hot-plug event. A link may be designated to be an inter-domain link when a read of the switch configuration space of the switch across the link results in an ERROR packet being sent that shows that the topology ID field has been previously assigned. When an inter-domain link is discovered, the connection manager may notify system software. The mechanism used to deliver the notification may be implementation-defined.

In various embodiments, the transport layer may only define the routing of inter-domain configuration packets between the two connection managers of the domains that are connected by an inter-domain link. Routing of configuration packets across multiple domains may be controlled by system software. When domains are daisy-chained, configuration packets passing from the originating domain may be delivered to the connection managers of every domain along the path to the target domain. The connection managers of the intermediate domains may pass the configuration packets to the system software which may be responsible for relaying the packet across the inter-domain link towards the target domain.

The routing of inter-domain REQUEST packets may be in accordance with one or more rules. For example, in various embodiments, system software on the originating domain may form REQUEST packet with a route string that points to the egress port of the domain that connects to the inter-domain link over which the packet must be forwarded and the CM bit may be set to 0. The packet may be required to be routed based on the route string at each hop within the domain and forwarded over the egress port across the inter-domain link. At the ingress port of the receiving domain, the control port may remap the route string to point to the ingress port over which the packet was received and the CM bit may be set to 1. In various embodiments, the packet may then be required to be routed to the connection manager of the receiving domain like other intra-domain configuration packets. The packet may be required to be delivered by the connection manager of the receiving domain to system software.

The routing of inter-domain RESPONSE packets may follow one or more of the same steps above. In various embodiments, system software that constructs the RESPONSE packet may use the route string in the corresponding REQUEST packet with the CM bit set to 0.

In various embodiments, the transport layer may employ a hierarchical, credit-based flow control scheme with respect to flow through the multi-protocol switching fabric to prevent or minimize overflow of receive buffers due to congestion. In various embodiments, the flow control scheme may allow a receiver to implement various buffer allocation strategies ranging from dedicated buffers per-path to shared buffer pools that are dynamically shared by multiple paths.

In various embodiments, flow control may be turned off on a per-path basis. When flow control is turned off for a path, the path may be required to be provisioned with a receive buffer that can hold at least one maximum sized transport layer packet at each link.

Figure 11:
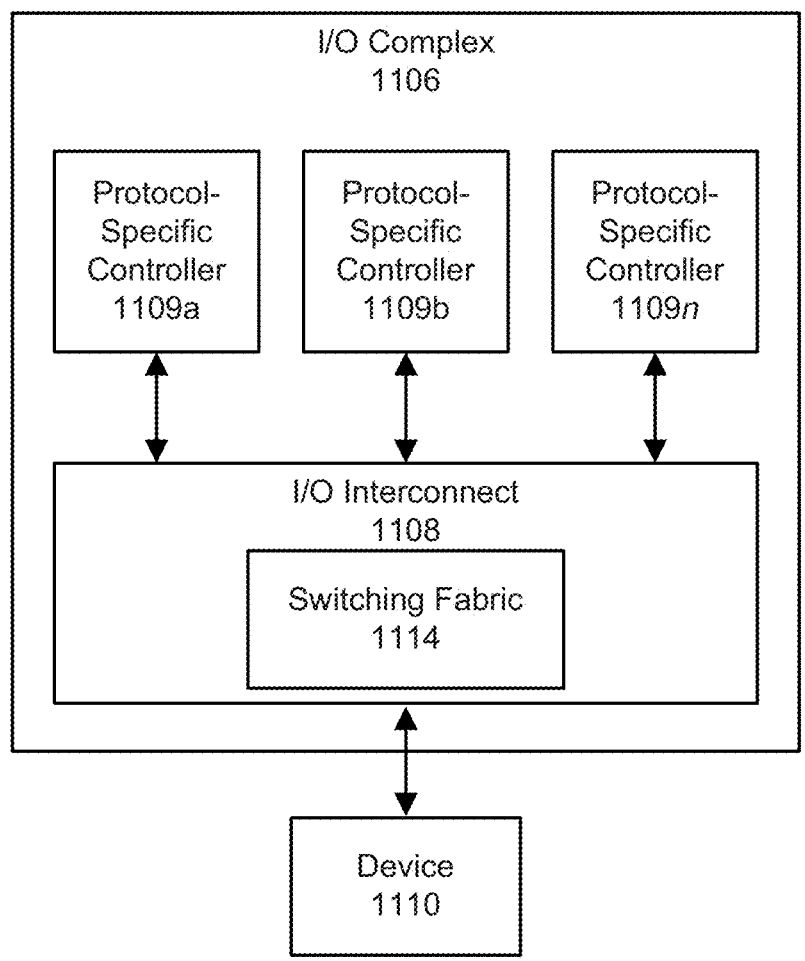
FIG. 11 describes a multi-protocol tunneling I/O complex and interconnect, in accordance with various embodiments of the present disclosure.

FIG. 11 shows an example I/O complex 1106 in accordance with various embodiments. I/O complex 1106 may be similar to the I/O complex 106 of FIG. 1, including an I/O interconnect 1108 configured to couple with a device 1110. The device 1110 may be configured with one or more I/O protocols (e.g., PCI Express®, USB, DisplayPort, HDMI®, etc.).

In various embodiments, the I/O complex 1106 may be configured to connect the device 1110 with one or more protocol-specific controllers 1109a, 1109b, . . . 1109n via the I/O interconnect 1108 in order to tunnel multiple I/O protocols over a common link in a manner that is transparent to the OS software stacks of tunneled I/O protocols. The protocol-specific controllers 1109a, 1109b, . . . 1109n may be configured to then communicate with respective protocol-specific drivers in the OS for configuring the device 1110 as if the device 1110 was directly connected with the protocol-specific controller 1109a, 1109b, . . . 1109n.

Figure 12:
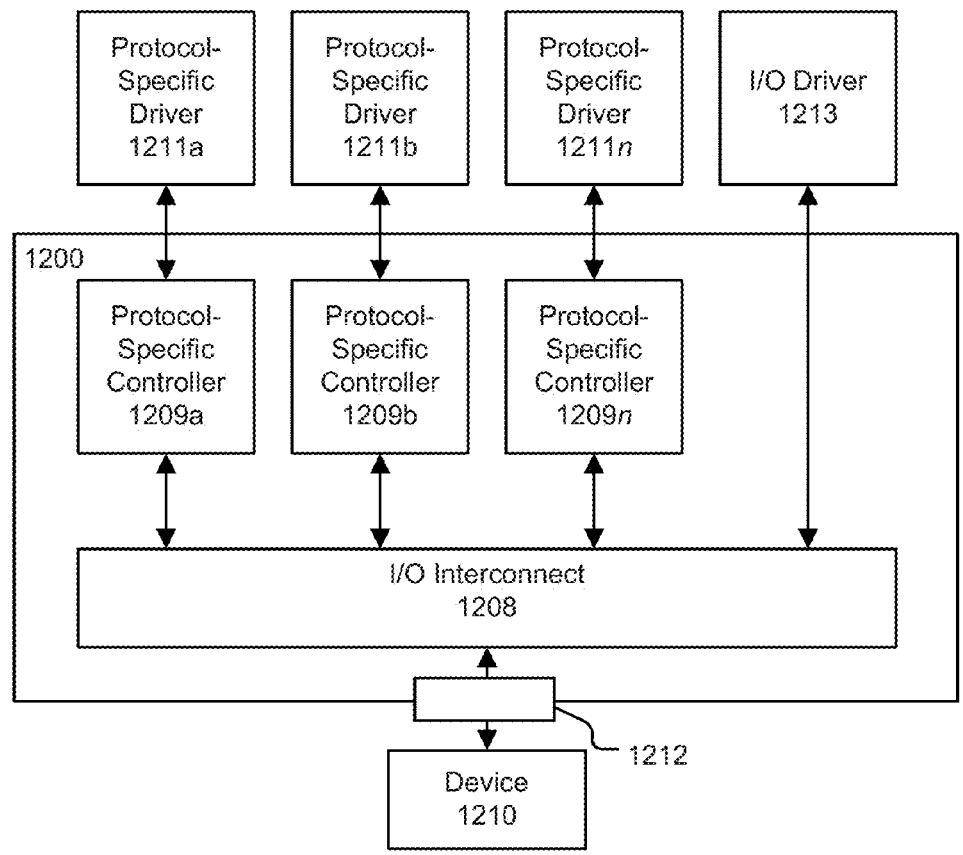
FIG. 12 describes a multi-protocol tunneling I/O complex and interconnect, in accordance with various embodiments of the present disclosure.

FIG. 12 shows an example hardware and software implementation of a multi-protocol apparatus (such as apparatus 100 of FIG. 1, for example) configured to tunnel multiple I/O protocols over a common link in a manner that is transparent to operating system software stacks of tunneled I/O protocols. In various embodiments, a multi-protocol apparatus may employ a multi-level hot-plug signaling scheme to support the tunneling of multiple I/O protocols over a common interconnect in a software-transparent manner.

For the implementation shown in FIG. 12, an I/O hot-plug indication may be sent by the I/O interconnect 1208 to the I/O driver in the OS (or to embedded I/O firmware) when the device 1210 is plugged into the non-protocol-specific connector port 1212 of the apparatus 1200. The hot-plug indication may then be processed by the I/O driver 1213 in the OS/firmware, resulting in communication path(s) being established between the I/O interconnect 1208 and the device 1210. In various embodiments, establishing communication path(s) may include configuring one or more paths between a source adapter and a destination adapter in a domain (described more fully elsewhere). Once the path(s) are established, mapped I/O protocol-specific configuration may be performed in which a protocol-specific hot-plug indication may be sent by the associated protocol-specific controller 1209a, 1209b, . . . 1209n to the respective protocol-specific driver 1211a, 1211b, . . . 1211n in the OS/firmware. The protocol-specific driver 1211a, 1211b, . . . 1211n may then configure the associated protocol-specific controller 1209a, 1209b, . . . 1209n as if the device 1210 was directly connected with the protocol-specific controller 1209a, 1209b, . . . 1209n. At this point, the peripheral device 1210 may be visible to system software and configured to be used by applications.

In various embodiments, the apparatus 1200 may be configured such that when the device 1210 is disconnected from the port 1212, a reverse sequence of events may occur. Specifically, the protocol-specific drivers 1211a, 1211b, . . . 1211n may process the protocol-specific unplug event, and then after the protocol-specific processing, the I/O driver 1213 may process the I/O unplug event.

Peripheral devices described herein (device 110, 210, 1110, or 1210, for example) may be any one of various types of devices, as noted earlier. In various embodiments, the peripheral device may be an expansion port (or other multi-protocol peripheral device) with which one or more other devices, with one or more I/O protocols, may be coupled. For example, for embodiments in which the peripheral device is an expansion port, the device may be simultaneously coupled with a PCI Express® device and a DisplayPort device, which may be coupled with an I/O complex through the expansion port device. In another example, the peripheral device may be a mobile or desktop computer system and one or more other devices may be coupled with the mobile or desktop computer system and with the I/O complex through the device. In various embodiments, multiple peripheral devices may be coupled together by daisy chaining the devices together.

Figure 13:
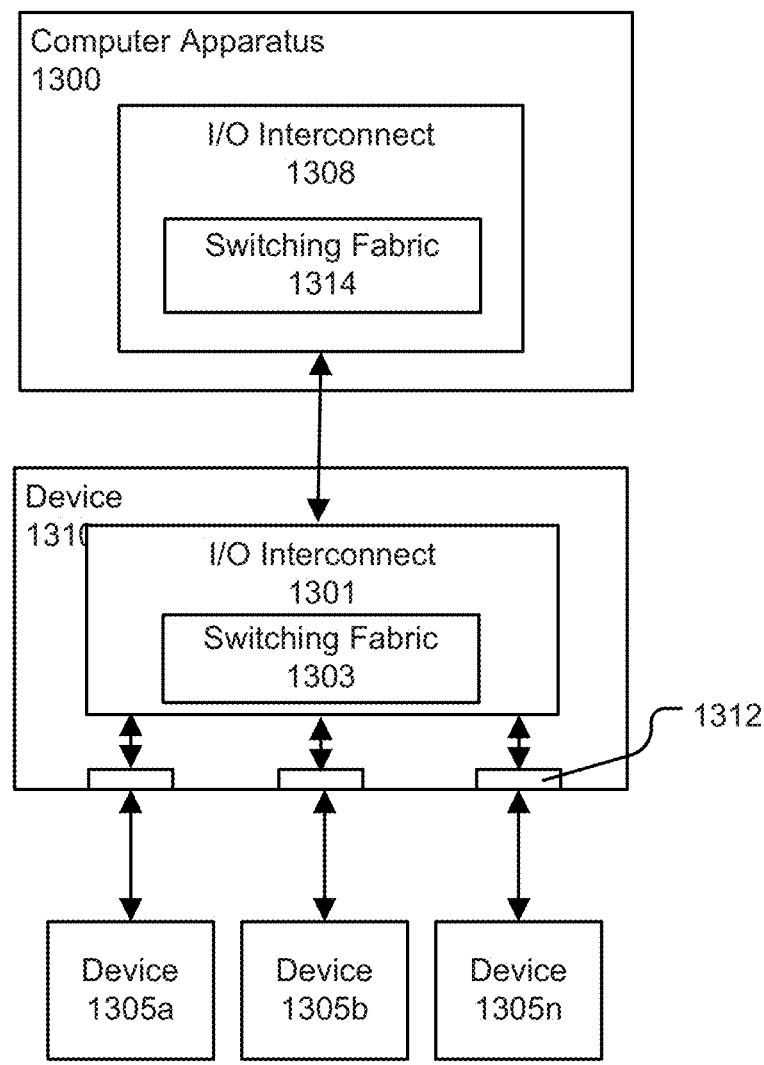
FIG. 13 describes a device (e.g., a peripheral device) including a multi-protocol tunneling I/O interconnect connected with a multi-protocol tunneling I/O interconnect, both in accordance with various embodiments of the present disclosure.

In various embodiments, the peripheral device and/or the other devices coupled with the peripheral device may also include an I/O interconnect similar to one or more of the I/O interconnects 108, 208, 1108, 1208 described herein. As shown in FIG. 13, for example, a device 1310 including a multi-protocol interconnect 1301, which in turn includes a multi-protocol switching fabric 1303, may be configured to be interconnected with a multi-protocol apparatus 1300 which also includes a multi-protocol interconnect 1308 and switching fabric 1314. One or more other peripheral devices 1305a, 1305b, . . . 1305n may be interconnected with the I/O interconnect 1301 via one or more corresponding non-protocol-specific ports 1312.

Figure 14:
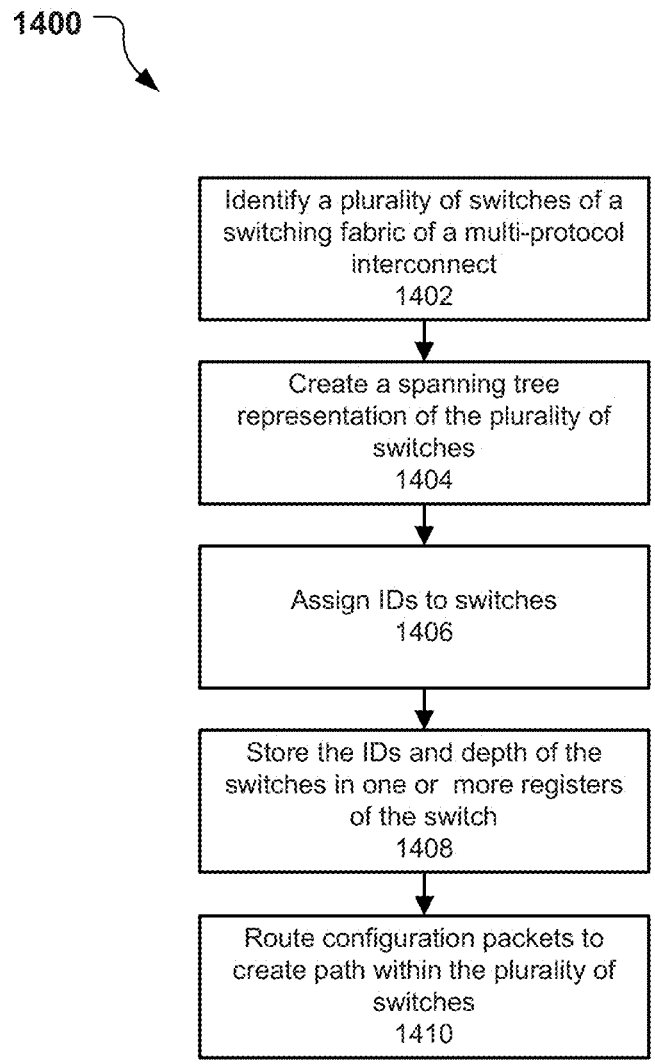
FIG. 14 is a flow diagram of a method for configuring a multi-protocol tunneling I/O interconnect, in accordance with various embodiments of the present disclosure.

FIG. 14 is a flow diagram of an example method 1400 for configuring a multi-protocol tunneling I/O interconnect, in accordance with various embodiments of the present disclosure. The method 1400 may include one or more functions, operations, or actions as is illustrated by blocks 1402-1410.

Processing for the method 1400 may start with block 1402 by identifying a plurality of switches of a switching fabric of a multi-protocol interconnect.

The method 1400 may proceed to block 1404 by creating a spanning tree representation of the plurality of switches.

The method 1400 may proceed to block 1406 by assigning unique identifications (IDs) to the switches of plurality of switches of the spanning tree. In various embodiments, the IDs may represent the relative positions of the switches within the spanning tree.

The method 1400 may proceed to block 1408 by storing the IDs and depth of the switches (in the spanning tree) in one or more registers of each of the switches.

The method 1400 may proceed to block 1410 by routing configuration packets through the spanning tree to the switches based at least in part on their respective IDs.

Figure 15:
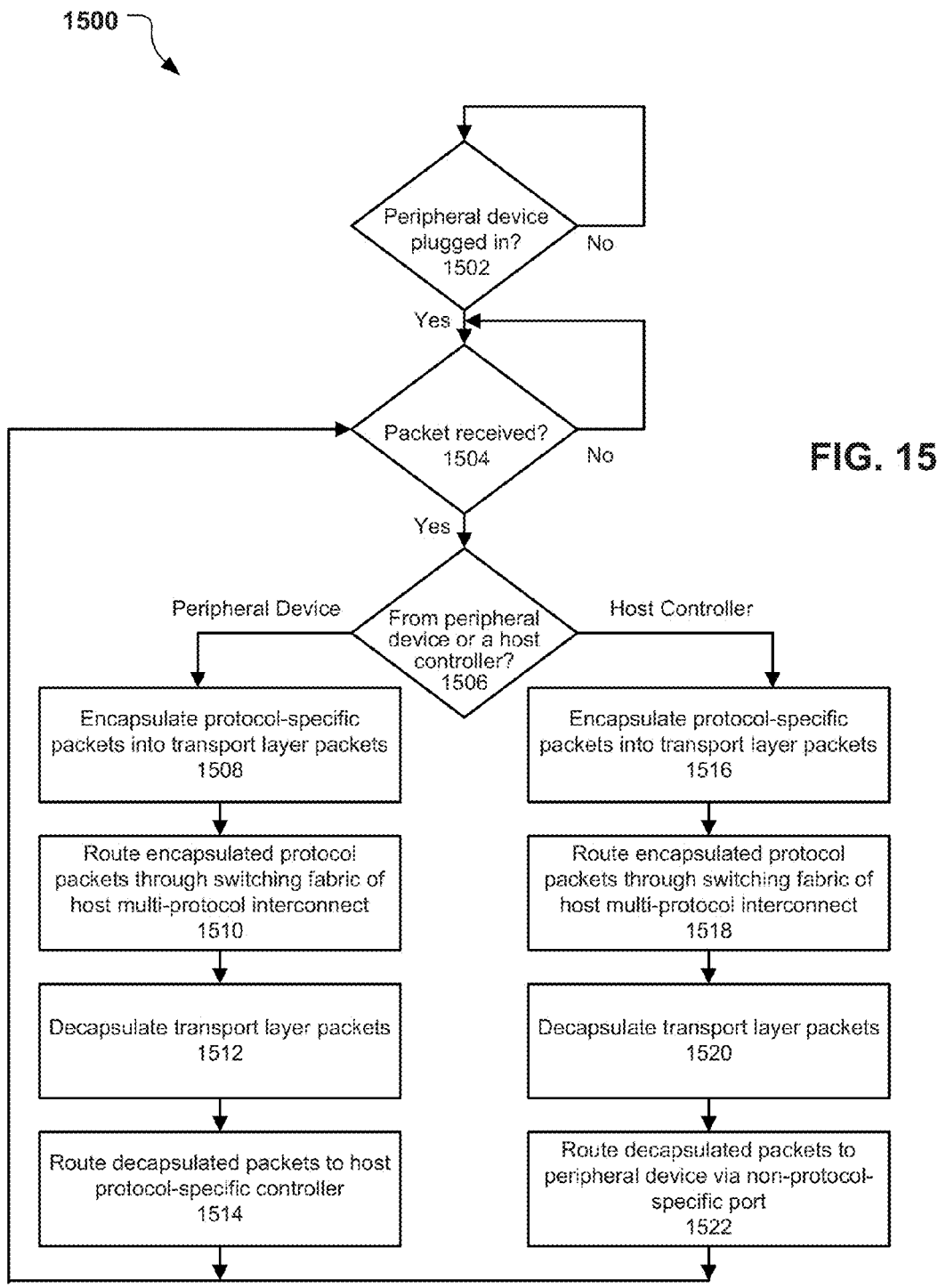
FIG. 15 is a flow diagram of a method for operating a computer apparatus including a multi-protocol tunneling I/O interconnect, in accordance with various embodiments of the present disclosure.

FIG. 15 illustrates an example method for operating a computer apparatus including a multi-protocol tunneling I/O interconnect, in accordance with various embodiments of the present disclosure. The method 1500 may include one or more functions, operations, or actions as is illustrated by blocks 1502-1522.

Processing for the method 1500 may start with block 1502 by determining whether a peripheral device has been plugged into a non-protocol-specific port of a computer apparatus including a multi-protocol tunneling I/O interconnect. Plugging may refer to a peripheral device being directly coupled with the non-protocol-specific port and/or a target peripheral device being directly coupled to some other peripheral device directly coupled with the non-protocol-specific port. In the latter embodiments, one or more other peripheral devices may be operatively disposed between the target peripheral device and the non-protocol-specific port. If no peripheral device has been plugged, then processing in block 1502 may repeat. In various embodiments, the computer apparatus may be configured to issue an interrupt signal indicating when a peripheral device has been plugged (e.g., hot-plugged).

Processing for the method 1500 may proceed to block 1504 by determining whether a data packet has been received. If no data packet has been received, then processing in block 1504 may repeat. In various embodiments, a data packet may be received from the peripheral device or from within the computer apparatus. In various embodiments, data packets within the computer apparatus may be received by the multi-protocol tunneling I/O interconnect from a protocol-specific controller ("host protocol-specific controller") of the computer apparatus.

Processing for the method 1500 may proceed to block 1506 by determining whether the data packet was received from the peripheral device or from a host protocol-specific controller. If no data packet has been received, then processing in block 1506 may repeat.

If the data packet was received from the peripheral device, processing for the method 1500 may proceed to block 1508 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 1500 may proceed to block 1510 by simultaneously routing the first and second transport layer packets through the switching fabric of the I/O interconnect.

Processing for the method 1500 may proceed to block 1512 by decapsulating the transport layer packets. In various embodiments, decapsulation may be performed an adapter port of a switch of the switching fabric.

Processing for the method 1500 may proceed to block 1514 by routing the decapsulated packets to different host protocol-specific controllers of the computer apparatus.

If the data packet was received from the peripheral device, processing for the method 1500 may proceed from block 1506 to block 1516 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 1500 may proceed to block 1518 by simultaneously routing the first and second transport layer packets through the switching fabric of the I/O interconnect.

Processing for the method 1500 may proceed to block 1520 by decapsulating the transport layer packets. In various embodiments, decapsulation may be performed an adapter port of a switch of the switching fabric.

Processing for the method 1500 may proceed to block 1522 by routing the decapsulated packets to a peripheral device via a non-protocol-specific port of the computer apparatus.

Figure 16:
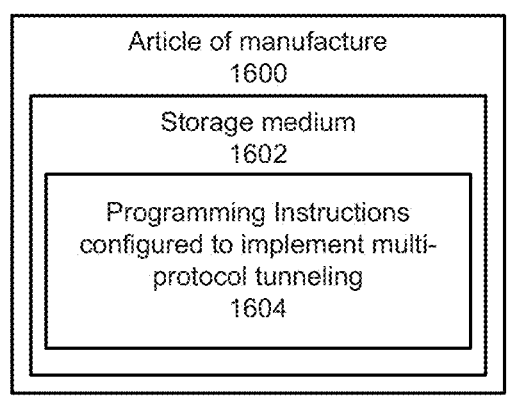
FIG. 16 describes an article of manufacture having programming instructions configured to cause an apparatus to practice some or all aspects of multi-protocol tunneling (of the methods of FIG. 15 and FIG. 16, for example), in accordance with embodiments of the present disclosure.

In various embodiments, an article of manufacture may be employed to implement one or more methods as disclosed herein. FIG. 16 describes an example article of manufacture 1600. As shown, the article of manufacture 1600 may include a computer-readable non-transitory storage medium 1602 and a storage medium 1602. The storage medium 1602 may include programming instructions 1604 configured to cause an apparatus to practice some or all aspects of multi-protocol tunneling, in accordance with embodiments of the present disclosure.

The storage medium 1602 may represent a broad range of persistent storage medium known in the art, including but not limited to flash memory, optical disks or magnetic disks. The programming instructions 1604, in particular, may enable an apparatus, in response to their execution by the apparatus, to perform various operations described herein. For example, the storage medium 1602 may include programming instructions 1604 configured to cause an apparatus to practice some or all aspects of multi-protocol tunneling of the methods of FIG. 14 and FIG. 15, for example, in accordance with embodiments of the present disclosure.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus comprising,
a multiprotocol interconnect and a first switch wherein the first switch is part of the multiprotocol interconnect and wherein the first switch comprises,
   at least one connection port wherein the connection port is to be operatively coupled to a second switch,
   a first adapter port wherein the first adapter port is configured to decapsulate incoming protocol-specific packets and configured to route decapsulated protocol-specific packets to a first protocol specific driver within the apparatus, and
   a second adapter port wherein the second adapter port is configured to decapsulate incoming protocol-specific packets and configured to route decapsulated protocol-specific packets to a second protocol specific driver within the apparatus,
wherein the encapsulation of protocol-specific packets is to allow protocol specific packets of different types to flow over a multiprotocol switching fabric when the first and the second switches are part of the multiprotocol switching fabric, wherein the multiprotocol switching fabric is to operably connect a plurality of devices each operating according to different protocols to the multiprotocol interconnect, wherein the protocol for the first protocol-specific driver is different from the protocol for the second protocol-specific driver, wherein the protocols of the first and the second protocol specific drivers are selected from the group including PCI express, USB, DisplayPort, and HDMI, and wherein the connection port is to concurrently transfer data to and receive data from both the first and the second adapter ports over a common I/O (input/output) link.

2. The apparatus of claim 1, wherein the multiprotocol switching fabric is capable of concurrently routing packets of the first protocol and the second protocol over a single path, wherein the first protocol is different from the second protocol.

3. The apparatus of claim 1, wherein the first adapter port is to encapsulate protocol-specific packets received from first protocol specific driver and the second adapter port is to encapsulate protocol-specific packets received from the second protocol-specific driver, wherein the encapsulation of protocol-specific packets is to allow the protocol-specific packets to flow over the multiprotocol switching fabric.

4. The apparatus of claim 1, wherein the first switch is configured to encapsulate outgoing protocol-specific packets into transport layer packets.

5. The apparatus of claim 1, wherein the first switch comprises a crossbar switch.

6. The apparatus of claim 1, wherein the first switch additionally comprises a time management unit to distribute and synchronize time throughout the multi-protocol switching fabric.

7. An apparatus comprising,
a processor;
a multiprotocol interconnect including a first switch wherein the first switch comprises
   at least one connection port wherein the connection port is to be operatively coupled to a second switch,
   a first adapter port wherein the first adapter port is configured to decapsulate incoming protocol-specific packets and configured to route decapsulated protocol-specific packets to a first protocol specific driver within the apparatus, and
   a second adapter port wherein the second adapter port is configured to decapsulate incoming protocol-specific packets and configured to route decapsulated protocol-specific packets to a second protocol specific driver within the apparatus,
wherein the encapsulation of protocol-specific packets is to allow protocol specific packets of different types to flow over a multiprotocol switching fabric when the first and the second switches are part of the multiprotocol switching fabric, wherein the multiprotocol switching fabric is to operably connect a plurality of devices each operating according to different protocols to the multiprotocol interconnect, wherein the protocol for the first protocol-specific driver is different from the protocol for the second protocol specific driver, wherein the protocols of the first and the second protocol specific drivers are selected from the group including PCI express, USB, DisplayPort, and HDMI, and wherein the connection port is to concurrently transfer data to and receive data from both the first and the second adapter ports over a common I/O (input/output) link,
wherein the processor is to receive data from and transfer data to the multiprotocol interconnect.

8. The apparatus of claim 7, wherein the multiprotocol switching fabric is capable of concurrently routing packets of the first protocol and the second protocol over a single path, wherein the first protocol is different from the second protocol.

9. The apparatus of claim 7, wherein the first adapter port is to encapsulate protocol-specific packets received from first protocol specific driver and the second adapter port is to encapsulate protocol-specific packets received from the second protocol-specific driver, wherein the encapsulation of protocol-specific packets is to allow the protocol-specific packets to flow over the multiprotocol switching fabric.

10. The apparatus of claim 7, wherein the first switch is configured to encapsulate outgoing protocol-specific packets into transport layer packets.

11. The apparatus of claim 7, wherein the first switch comprises a crossbar switch.

12. The apparatus of claim 7, wherein the first switch additionally comprises a time management unit capable of distributing and synchronizing time throughout the multi-protocol switching fabric.

13. A switch comprising,
at least one connection port wherein the connection port is to be operatively coupled to a second switch,
a first adapter port wherein the first adapter port is configured to decapsulate incoming protocol-specific packets and configured to route decapsulated protocol specific packets to a first protocol specific driver within the apparatus, and
a second adapter port wherein the second adapter port is configured to decapsulate incoming protocol specific packets and configured to route decapsulated protocol-specific packets to a second protocol specific driver within the apparatus,
wherein the encapsulation of protocol specific packets is to allow protocol specific packets of different types to flow over a multiprotocol switching fabric when the first switch and the second switch are part of the multiprotocol switching fabric, wherein the multiprotocol switching fabric is to operably connect a plurality of devices each operating according to different protocols to the first switch, wherein the protocol for the first protocol-specific driver is different from the protocol for the second protocol-specific driver, wherein the protocols of the first and the second protocol specific drivers are selected from the group including PCI express, USB, DisplayPort, and HDMI, and wherein the connection port is to concurrently transfer data to and receive data from both the first and the second adapter ports over a common I/O (input/output) link.

14. The switch of claim 13, wherein the multiprotocol switching fabric is capable of concurrently routing packets of the first protocol and the second protocol over a single path.

15. The switch of claim 13, wherein the first adapter port is to encapsulate protocol-specific packets received from first protocol specific driver and the second adapter port is to encapsulate protocol-specific packets received from the second protocol-specific driver, wherein the encapsulation of protocol-specific packets is to allow the protocol-specific packets to flow over the multiprotocol switching fabric.

16. The switch of claim 13, wherein the first switch is configured to encapsulate outgoing protocol-specific packets into transport layer packets.

17. The switch of claim 13, wherein the first switch comprises a crossbar switch.

18. The switch of claim 13, wherein the switch additionally comprises a time management unit to distribute and synchronize time throughout the multi-protocol switching fabric.

19. The apparatus of claim 1 wherein the connector port is a connector port that is not specific to the first or the second protocol.

20. The apparatus of claim 7 wherein the connector port a connector port that is not specific to the first or the second protocol.

21. The switch of claim 13 wherein the connector port a connector port that is not specific to the first or the second protocol.

* * * * *